United States Patent [19]
Vensland et al.

[11] Patent Number: 5,775,880
[45] Date of Patent: Jul. 7, 1998

[54] VALVE DISABLER FOR USE IN HIGH PRESSURE PIPE CLEANING SYSTEMS

[75] Inventors: David G. Vensland, Champlin; Edward P. Murphy, Blaine, both of Minn.

[73] Assignee: Hypro Corporation, St. Paul, Minn.

[21] Appl. No.: 619,074

[22] Filed: Mar. 20, 1996

[51] Int. Cl.⁶ .................................................. F04B 49/22
[52] U.S. Cl. .......................... 417/53; 417/427; 417/298
[58] Field of Search .............................. 137/522; 417/53, 417/427, 428, 446, 238, 297, 298

[56] References Cited

U.S. PATENT DOCUMENTS

| | | | |
|---|---|---|---|
| 2,667,299 | 1/1954 | Gustafson | 417/298 |
| 3,420,493 | 1/1969 | Kraft | 251/82 |
| 3,454,032 | 7/1969 | Hinz et al. | 251/82 |
| 4,921,214 | 5/1990 | Jernberg | 251/82 |
| 5,364,240 | 11/1994 | Salecker | 417/427 |
| 5,642,753 | 7/1997 | Thistle et al. | 417/446 |

*Primary Examiner*—Timothy Thorpe
*Assistant Examiner*—Peter G. Kurytnyk
*Attorney, Agent, or Firm*—Haugen & Nikolai, P.A.

[57] ABSTRACT

A valve disabler for use in high pressure pipe cleaning systems. The valve disabler of the present invention serves to disable a single cylinder in a multi-cylinder plunger pump so as to generate pulsatile pressure surges within a hose member. The pulsatile pressure surges cause the distal end of the hose member to move in a serpentine manner, thus allowing the hose member to negotiate down a tortuous path within the pipe without stalling or becoming otherwise impeded.

3 Claims, 3 Drawing Sheets

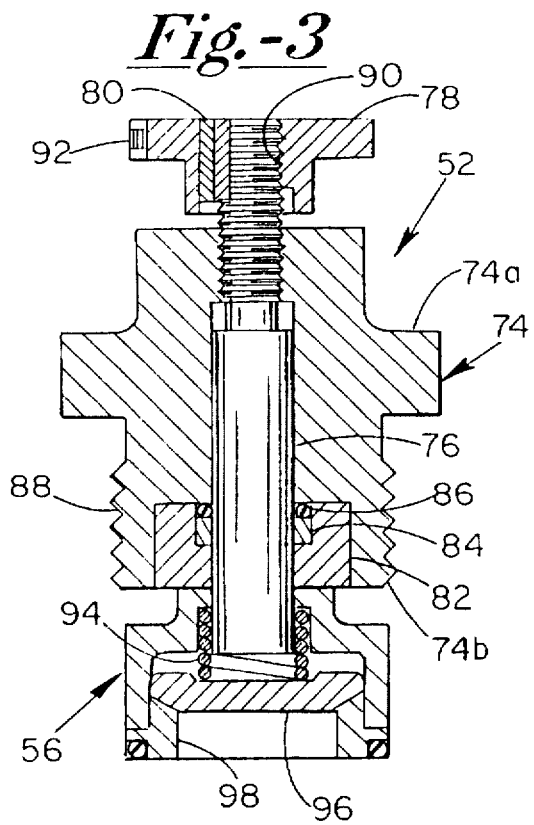
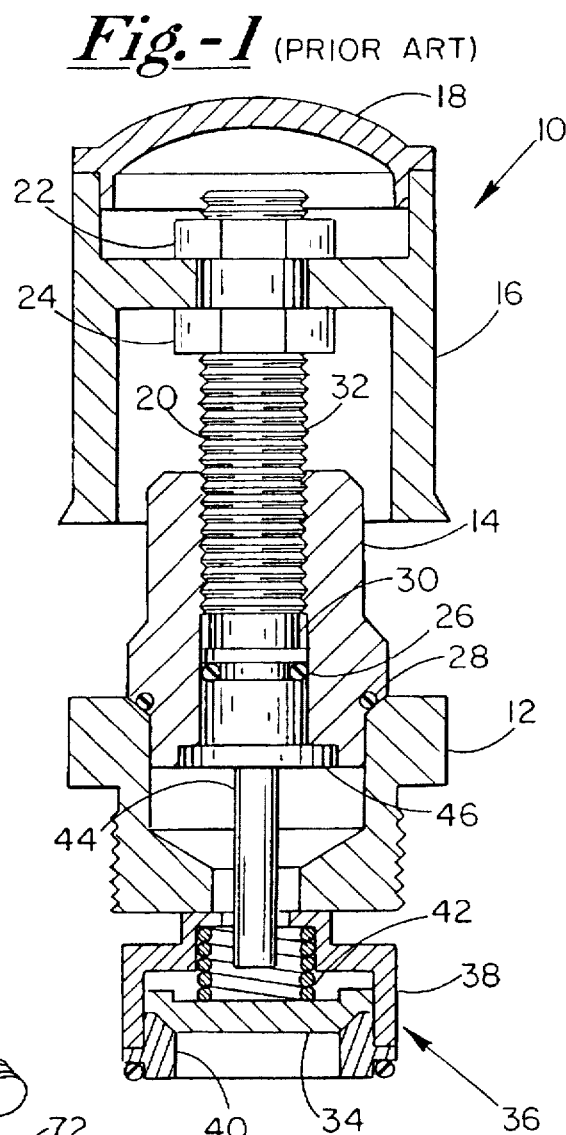
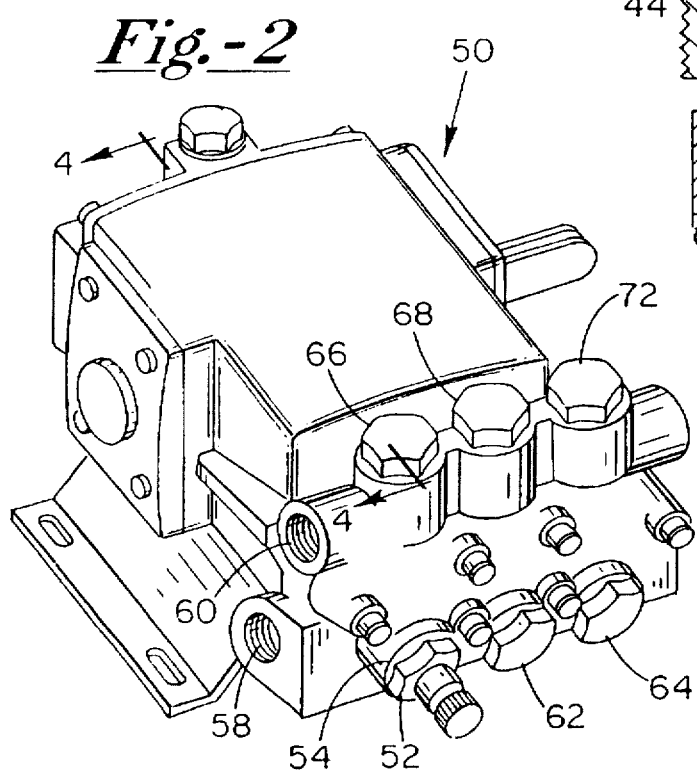

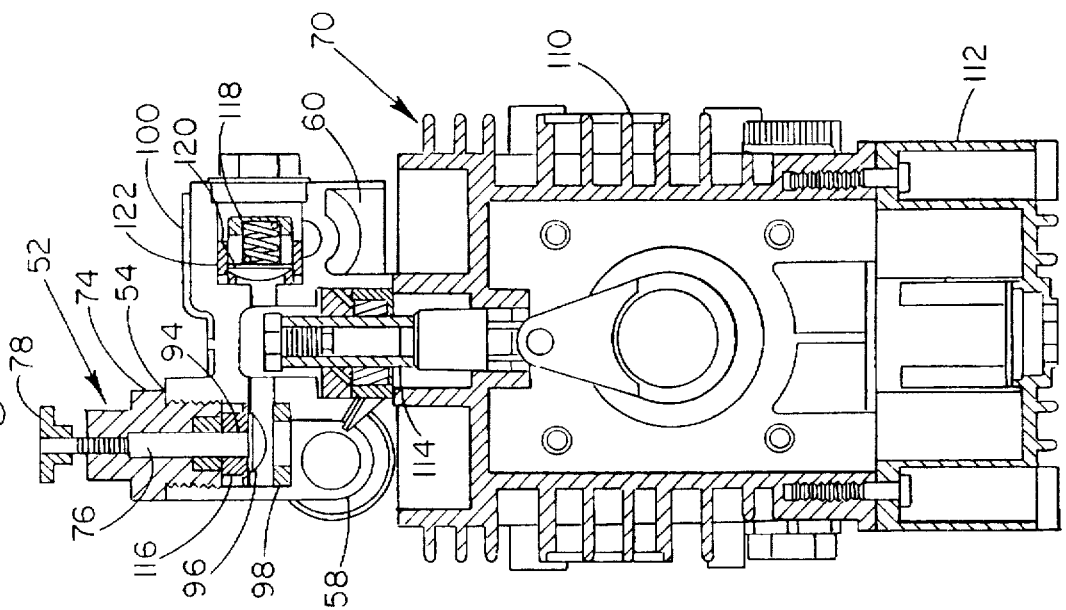
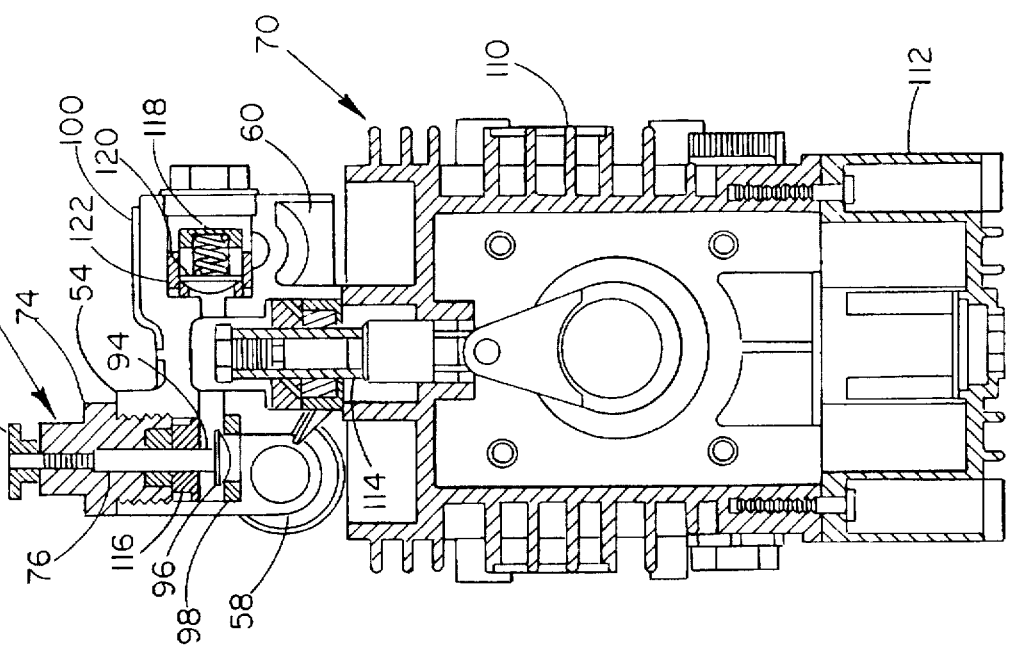

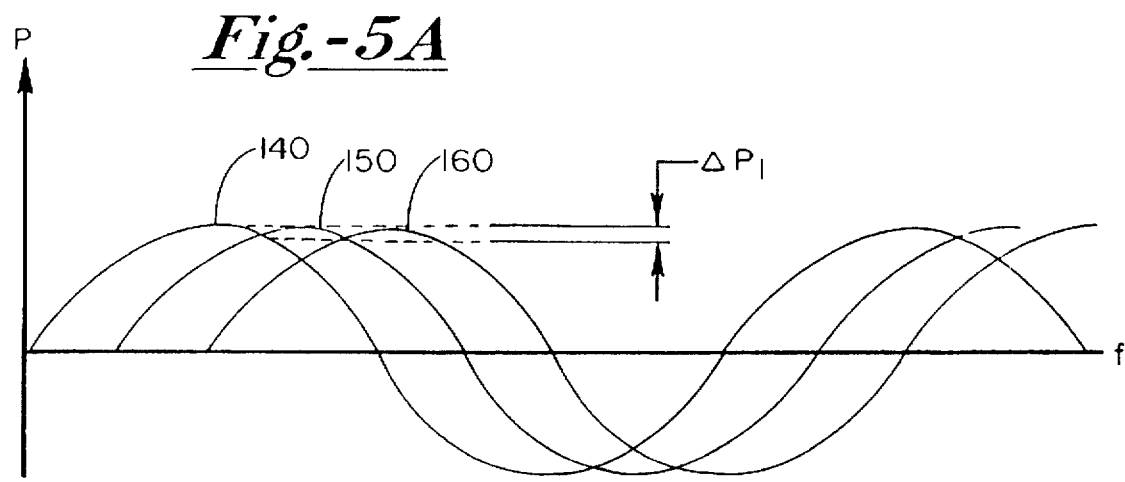
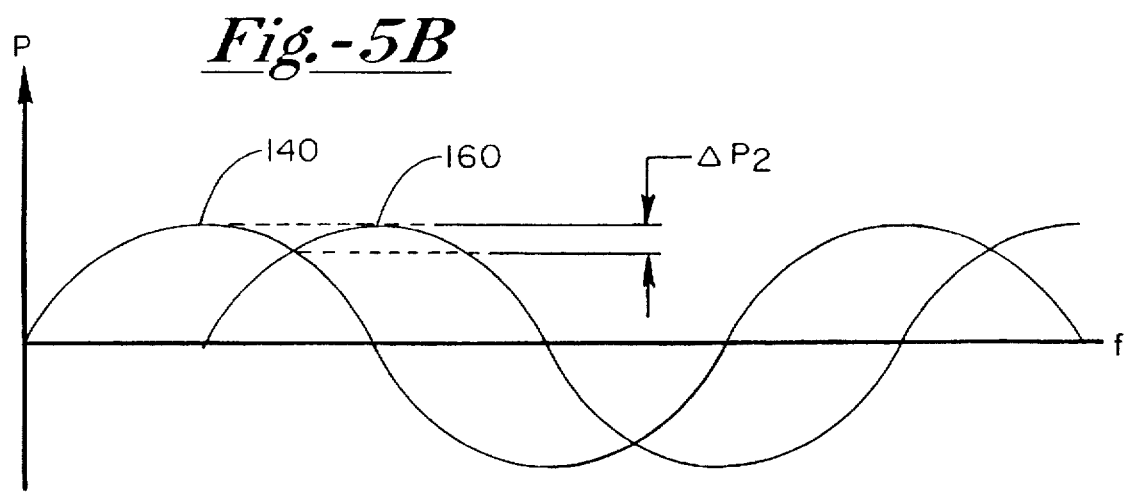

VALVE DISABLER FOR USE IN HIGH PRESSURE PIPE CLEANING SYSTEMS

BACKGROUND OF THE INVENTION

I. Field of the Invention

The present invention relates generally to the field of high pressure pipe cleaning systems. More particularly, the present invention relates to an improved external valve disabler for use with a multi-cylinder pump which allows a hose member to negotiate down a tortuous path within the pipe without stalling or becoming otherwise impeded.

II. Discussion of the Prior Art

Through time, the task of cleaning sewer pipes and other underground conduits has proven to be both laborious and vexing. The difficulty with such cleaning activity is due, in large part, to the relative inaccessibility of the pipes in that the pipes are disposed a fair distance beneath the surface of the earth and meander in a variety of different directions. As such, traversing the interior of the pipes to clean or remove obstructions is particularly burdensome. To date, one of the most popular methods of cleaning and removing obstructions within underground pipes involves passing a rotating auger through the pipe in order to slash through and remove any unwanted build up that may be encountered within the pipe. However, with the advent of PVC and other plastic underground piping, a significant drawback exists with the rotating auger method in that the blades of the rotating auger readily grind through and damage the plastic piping. With the exorbitant costs involved with removing and replacing the damaged pipes, the resulting problems from the use of the rotating auger may far outweigh the initial inconvenience associated with the clogged or dirty pipes.

In an effort to avoid the aforementioned problems with the auger method, an alternate method for cleaning and unclogging such underground pipes has been developed which involves the use of a high pressure pumping system for directing a stream of fluid within the pipe to blast away and flush out any obstruction or unwanted debris encountered therein. To be specific, a high pressure fluid pump is provided having a hose member extending therefrom with a jetter nozzle attached to the distal end of the hose member. The jetter nozzle, when supplied with high pressure fluid from the pump, is designed to generate a plurality of rearward facing propulsion fluid streams for pulling the hose member through the pipe, in addition to a forward facing penetrating fluid stream for blasting away debris within the pipe. In so doing, this method accomplishes the cleaning and removal of obstructions within underground piping without fear of damaging the pipe regardless of its construction. A problem exists, however, due to the meandering and tortuous nature of the underground piping. More particularly, it is oftentimes difficult for the jetter nozzle and hose member to negotiate past sharp turns or bends that are encountered in the underground piping. When such an impediment is encountered, the forward motion brought about by the propulsion fluid streams of the jetter nozzle is overcome and the hose member is incapable of traveling further within the pipe. This, of course, limits the effectiveness of the high pressure pumping system in cleaning and removing obstructions within the pipe.

Various efforts have been undertaken to correct the problem of having the hose member stall within the pipe. One of the most popular approaches is to purposely generate pulsatile pressure surges within the hose member to cause the jetter nozzle to wiggle back and forth in a serpentine manner. The serpentine movement of the jetter nozzle, it has been found, allows the jetter nozzle to negotiate past sharp bends or obstructions so as to overcome such stalling. The generation of pulsatile pressure surges within the hose member can be accomplished through the use of a multi-cylinder fluid pump in conjunction with a valve disabler for selectively disabling one of the inlet valves of the multi-cylinder pump. During normal operation, the multi-cylinder pump functions smoothly at full capacity, employing all cylinders to generate a fluid stream of high frequency pressure pulses within the hose member, wherein the pressure differential between each successive pressure pulse is relatively small. The nature of the fluid stream during normal pump operation (i.e. uninterrupted pressure pulses with a small pressure differential between pulses) allows the hose member to progress smoothly through the pipe in a substantially forward fashion with negligible lateral movement.

Conversely, with a single valve disabled, the multi-cylinder pump generates a fluid stream of interrupted pressure pulses wherein the pressure differential between each successive pressure pulse is relatively high. This fluid stream causes the distal end of the hose member to wiggle laterally back and forth in the desired serpentine manner. Thus, when a sharp bend or obstruction is encountered within the pipe that causes the hose member to become stalled, the valve disabler is employed to disable a single valve within the multi-cylinder pump so as to allow the jetter nozzle to negotiate past the sharp bend or obstruction. Once the stalled condition is overcome, the valve disabler is then used to return the multi-cylinder pump to normal operation such that the jetter nozzle resumes the forward propulsion of the hose member within the pipe.

Referring to FIG. 1, shown is a partial sectional view of a valve disabler 10 of the prior art used to toggle a multi-cylinder pump between normal operation, with all cylinders functioning, and restricted operation, with one cylinder disabled. Valve disabler 10 comprises a valve plug 12, an adjusting plug 14, a handwheel 16, a cover member 18, an adjusting stem 20, a first lock nut 22, a second lock nut 24, a first O-ring 26, and a second O-ring 28. Valve plug 12 has a first engagement portion extending downwardly from a flange portion, a concentrically disposed aperture extending through the longitudinal mid-line the flange portion and the first engagement portion, and a second engagement portion disposed within an upper portion of the concentrically disposed aperture. The first engagement portion is provided with a threaded portion extending along the outer periphery thereof for coupling valve plug 12 within an inlet valve port of a multi-cylinder pump (not shown). The second engagement portion is further provided with a threaded portion for threadedly receiving adjusting plug 14 therein. Adjusting plug 14 has a flange portion, a descending portion extending downward from a lower end of the flange portion, a neck portion extending upward from an upper end of the flange portion, and a concentrically disposed aperture extending through the longitudinal mid-line of the flange portion, the descending portion, and the neck portion. The flange portion extends radially outward from the descending portion and the neck portion. Second O-ring 28 is sandwiched between a bottom surface of the flange portion of adjustment plug 14, an upper surface of the flange portion of valve plug 12, and the outer periphery of the descending portion of adjustment plug 14 so as to minimize the amount of fluid that may leak or seep therebetween during high pressure operations. The descending portion of adjustment plug 14 is further provided with a threaded arrangement about the external periphery thereof for coupling adjusting plug 14 within the flange portion of valve plug 12. The concentrically disposed aperture formed within adjusting plug 14 has a threaded portion extending therealong for engagement with a threaded portion 32 formed along the exterior surface of adjusting stem 20. This threaded engagement allows adjusting stem 20 to be selectively and controllably positioned within adjustment plug 14.

Adjusting stem 20 is a generally elongated rod member having a flange portion 46, an upper portion extending between handwheel 16 and flange portion 46, and a descending portion extending downward from flange portion 46. Flange portion 46 has an increased diameter in relation to the diameters of the descending and upper portions of adjustment stem 20, and is dimensioned so as to be received within a notch formed along a lower edge of the concentrically disposed aperture of adjustment plug 14. The upper portion of adjustment stem 20 has a groove formed therein for accepting first O-ring 26 therein. First and second lock nuts 22, 24 serve to affix the upper portion of adjusting stem 20 to handwheel 16. Cover member 18 is disposed over the top of handwheel 16 to enclose first lock nut 22 and the upper end of adjusting stem 20 therein. The descending portion of adjustment stem 20 is of a greatly reduced diameter relative to the diameters of flange portion 46 and the upper portion of adjusting stem 20 such that adjusting stem 20 can contact a valve assembly 36.

Although a multi-cylinder pump is not shown in FIG. 1, valve assembly 36 of the type employed within an inlet valve of a multi-cylinder pump is provided to illustrate the disabling function of valve disabler 10. Valve assembly 36 includes an external valve cage 38 disposed proximate the lower portion of valve plug 12 which serves to enclose a valve poppet 34, a valve seat 40, and a valve spring 42. During normal pump operation, valve poppet 34 is free to operate within valve assembly 36 subject to the countervailing forces of valve spring 42 and the suction stroke. To be more specific, the normal bias of valve spring 42 forces valve poppet 34 into contact with valve seat 40 in the absence of the suction stroke. During the suction stroke, a vacuum is formed within the cylinder which draws fluid inward toward valve assembly 36 until the bias of valve spring 42 is eventually overcome. When this suction pressure overcomes the bias of valve spring 42, valve poppet 34 is forced away from valve seat 40 and fluid is drawn into the multi-cylinder pump. Following the suction stroke, the resiliency of valve spring 42 returns valve poppet 34 to a closed position against valve seat 40, thereby prohibiting the backward flow of fluid through valve assembly 36 during the return stroke. Valve disabler 10 can effectively override this normal operation by manually twisting handwheel 16 so as to drive the bottom portion of adjusting stem 20 into contact with valve poppet 34, thereby maintaining valve poppet 34 against valve seat 40. During this condition, valve assembly 36 is disabled in that it cannot draw fluid into the multi-cylinder pump during the suction stroke. As such, the pump is forced to operate only on those remaining cylinders which do not have disabled valve assemblies. This, in turn, causes the multi-cylinder pump to produce a fluid stream within the hose member that consists of a low frequency train of pressure pulses wherein the pressure differential between each successive pulse is relatively large. As noted above, this allows the jetter nozzle on the distal end of the hose member to thrash back and forth in a serpentine manner so as to traverse past any obstructions or sharp turns in an underground pipe.

However, several significant drawbacks exist with the aforementioned valve disabler 10 of the prior art. As an initial matter, the construction and design of valve disabler 10 entails substantial production costs, including increased costs for manufacturing the component parts, as well as increased costs for assembling the component parts into each valve disabler 10. With regard to manufacturing costs, valve disabler 10 of the prior art requires a significant amount of machining to prepare the requisite parts, especially in light of the plurality of different diameters that are required for each particular part. For example, adjusting stem 20 requires at least four separate machining activities to render the embodiment shown in FIG. 1, completely aside from the machining involved in producing threaded portion 32. The upper portion of adjusting stem 20, which extends between flange portion 46 and handwheel 16, must be machined having a predetermined diameter. A notch must be further machined within the upper portion of adjusting stem 20 for receiving first O-ring 26. Flange portion 46 must be machined having a diameter substantially greater than the diameter of the upper portion of adjusting stem 20. Finally, descending portion 44 must be machined down from the larger diameter of flange portion 46 such that descending portion 44 can pass concentrically within the center of valve spring 42 to reach valve poppet 34.

Adjustment plug 14 also requires several specific machining operations to yield the concentrically disposed aperture formed therein. More particularly, the concentrically disposed aperture formed within adjusting plug 14 must be machined to have a portion capable of receiving the upper portion of adjusting stem 20, as well as the flange portion 46 of adjusting stem 20. In the same regard, valve plug 12 requires several machining operations to produce the first engagement portion, the flange portion, and the concentrically disposed aperture extending through the longitudinal mid-line of the flange portion and first engagement portion. Moreover, the concentrically disposed aperture formed within valve plug 12 requires further machining to form an upper portion having an enlarged diameter capable of receiving adjustment plug 14, a lower portion having a reduced diameter capable of receiving the descending portion of adjusting stem 20, and a conical middle portion disposed between these upper and lower portions. Once again, such machining translates into increased production costs.

Valve disabler 10 of the prior art also involves increased assembly costs. As noted above, valve disabler 10 entails a multitude of requisite parts, including valve plug 12, adjusting plug 14, handwheel 16, cover member 18, adjusting stem 20, first and second lock nuts 22, 24, and first and second O-rings 26, 28. Therefore, even aside from the costs associated with machining the plurality of parts, a substantial amount of time and labor must be expended to meticulously position and assemble each of the requisite part into a fully operational valve disabler 10. This, of course, is disadvantageous in that such a protracted assembly process translates into increased assembly costs.

The use of a plurality of component parts also raises an increased likelihood that the valve disabler 10 will experience unwanted leaking. In this regard, each requisite part introduces a dimensional tolerance which, when considered cumulatively, causes added difficulty in aligning valve disabler 10 squarely over the valve assembly 36. As such, an increased likelihood exists that adjusting stem 20 will not be accurately positioned over valve assembly 36 so as to sufficiently force valve poppet 34 into valve seat 40 during the disabling mode of operation. This, of course, can translate into further difficulties, such leaking or the ineffective disablement of the valve assembly 36. Similarly, the individual construction of valve plug 12 and adjustment plug 14 raises an increased likelihood that leaking will occur therebetween, notwithstanding the use of second O-ring 28.

Yet another problem exists with the adjusting stem 20 of the prior art. In particular, a problem stems from the tapered design of the descending portion of adjusting stem 20. As can be seen, this descending portion is tapered so as to have a relatively small diameter which effectively reduces the contact area between the terminal end of the descending portion of adjusting stem 20 and the valve poppet 34. With such a reduced contact area, an increased likelihood exists that the adjusting stem 20 may become dislodged or removed from contacting valve poppet 34. Thus, the reduced contact area between adjusting stem 20 and valve poppet 34 may cause valve disabler 10 to operate in an unreliable manner. Due to the time and money investment associated with cleaning underground piping systems, even the possibility of this unreliable behavior is completely unacceptable. Moreover, the tapered nature of the descending portion of adjusting stem 20 creates a likelihood that the adjusting stem 20 will experience stem damage as it engages with the valve poppet 34 and aligns the valve poppet 34 within the valve seat 40. Such damage to the adjusting stem 20 may result in increased replacement costs and other related problems, such as increased down time while working on site.

Valve disabler 10 of the prior art is also rather cumbersome and bulky relative to valve assembly 38 and the multi-cylinder pump itself In particular, cover member 18 extends approximately 2½ inches from the side of the multi-cylinder pump when valve plug 12 is filly screwed into the given inlet valve port. Such an arrangement runs directly counter to the ever-increasing desire to conserve space and miniaturize operations. Moreover, this may present potential safety problems in that an increased likelihood exists for inadvertent contact with valve disabler 10 due to the degree to which it extends from the side of the multi-cylinder pump. Such inadvertent contact may result in damage to valve disabler 10 in addition to valve assembly 38.

A need therefor exists for an improved valve disabler for use in selectively disabling a single valve in a multi-cylinder pump so as to allow a hose member to effectively negotiate down a meandering and tortuous path within an underground piping system without stalling or becoming otherwise obstructed. More particularly, a need exists for a valve disabler having a simplified design which requires a minimal number of requisite parts and assembly labor. A need similarly exists for a valve disabler that will not experience leaking during operation. A need furthermore exists for a valve disabler which is economical, requiring a minimal amount of machining to produce each requisite part. A need similarly exists for a valve disabler which can be repeatedly positioned over the valve assembly in an accurate fashion so as to ensure the proper placement of the valve poppet within the valve seat under all circumstances. A further need exists for an improved valve disabler having an increased contact between the bottom of the adjusting stem and the valve poppet to increase the reliability of the valve disabler. A need also exists for a valve disabler having an adjusting stem of increased width and durability so as to minimize the likelihood that the adjusting stem will experience damage during operation. A need also exists for a valve disabler of reduced size so as to minimize the likelihood that the valve disabler will experience inadvertent contact.

OBJECTS AND SUMMARY OF THE INVENTION

Accordingly, it is a primary object of the present invention to produce an improved valve disabler for use with a multi-cylinder pump wherein the valve disabler has a simplified design which requires a minimal amount of requisite parts and labor for assembly than found in the prior art.

It is a still further object of the present invention to produce an improved valve disabler for use with a multi-cylinder pump wherein the valve disabler will not experience leaking.

It is yet another object of the present invention to produce an improved valve disabler for use with a multi-cylinder pump wherein the valve disabler is economical, requiring a minimal amount of machining to produce each requisite part.

It is a still further object of the present invention to produce an improved valve disabler for use with a multi-cylinder pump wherein the valve disabler is of reduced size so as to minimize the likelihood that it will experience inadvertent contact.

It is a still further object of the present invention to produce an improved valve disabler for use with a multi-cylinder pump wherein the valve disabler can be repeatedly positioned over the valve assembly in an accurate fashion so as to ensure the proper placement of the valve poppet within the valve seat under all circumstances.

It is yet another object of the present invention to produce an improved valve disabler for use with a multi-cylinder pump wherein the valve disabler has an increased contact area between the bottom of the adjusting stem and the valve poppet to increase the reliability of the valve disabler.

It is a still further object of the present invention to produce an improved valve disabler for use with a multi-cylinder pump wherein the valve disabler has an adjusting stem of increased width and durability so as to minimize the likelihood that the adjusting stem will experience damage during operation.

In accordance with a broad aspect of the present invention, the present invention accomplishes the aforementioned objects by providing an apparatus for disabling a valve assembly in a multi-cylinder pump, wherein the multi-cylinder pump defines an aperture for receiving the valve assembly and the valve assembly includes a valve poppet and a valve seat. The apparatus of the present invention comprises a generally cylindrical body member of unibody construction having a first end disposed opposite and generally parallel to a second end, an interior surface defining a concentric and elongated aperture between the first end and the second end, and a first threaded engagement portion disposed along an exterior surface of the body member proximate the second end for engaging the body member to the aperture of the multi-cylinder pump. The aperture further includes a threaded portion proximate the first end and a washer portion proximate the second end. A generally elongated stem member is provided which extends concentrically within the aperture of the body member. The stem member has a first end, a second end, and a threaded portion disposed proximate the first end for engagement with the threaded portion of the aperture of the body member. A knob member is also provided which is fixedly attached to the first end of the stem member. A washer member is further provided for placement within the washer portion of the aperture of the body portion. The washer member includes an interiorly disposed groove extending between the washer member, the stem member, and the body member, wherein the groove is capable of receiving at least one sealing ring therein. The body member is positioned proximate the valve assembly such that the second end of the stem member may be selectively brought into contact with the valve poppet to maintain the valve poppet against the valve seat to disable a single cylinder within the multi-cylinder pump.

In yet another broad aspect of the present invention, a method of dispensing a train of pressure pulses, comprising the steps of: A method for selectively disabling a single valve within a multi-cylinder pumping system, comprising the steps of: (a) providing a valve disabler having: (1) a body member having an upper surface, a lower surface, a concentrically disposed aperture formed between the upper and lower surfaces having a stem accepting portion and a washer accepting portion, and an exteriorly disposed engagement portion for affixing the body member proximate the inlet valve assembly of the multi-cylinder pump; (2) a generally elongated and cylindrical stem member extending concentrically within the stem accepting portion of the aperture of the body member, the stem member including a threaded portion for engagement with the stem accepting portion of the aperture of the body member, and an engagement notch for fixing a knob member to the stem member; and (3) a seal arrangement disposed within the washer accepting portion of the aperture of the body member, the seal arrangement including a washer member having a concentrically disposed aperture formed therein for accepting the stem member and a groove capable receiving at least one sealing ring therein; and (b) selectively operating the knob member to force the stem member into contact with the valve poppet such that the pumping system generates a low frequency train of pressure pulses wherein the pressure differential between each pulse of the train of pressure pulses causes a hose member attached to the multi-cylinder pumping system to move back and forth in a serpentine manner.

According to still another broad aspect of the present invention, an improved valve disabler is provided for use in high pressure pipe cleaning systems, wherein the high pressure pipe cleaning system includes a multi-cylinder pump, a hose member connected to an outlet line of the multi-cylinder pump, and a nozzle attached to a distal end of the hose member, and wherein the multi-cylinder pump includes an inlet valve assembly having a valve poppet and a valve seat. The improved valve disabler of the present invention comprises a body member having an upper surface, a lower surface, a concentrically disposed aperture formed between the upper and lower surfaces having a stem accepting portion and a washer accepting portion, and an exteriorly disposed engagement portion for affixing the body member proximate the inlet valve assembly of the multi-cylinder pump. A generally elongated and cylindrical stem member is provide which extends concentrically within the stem accepting portion of the aperture of the body member. The stem member includes a threaded portion for engagement with the stem accepting portion of the aperture of the body member, and an engagement notch for fixing a knob member to the stem member. A seal arrangement is disposed within the washer accepting portion of the aperture of the body member, wherein the seal arrangement includes a washer member having a concentrically disposed aperture formed therein for accepting the stem member and a groove capable receiving at least one sealing ring therein. During normal operation, the stem member is removed from contacting the valve poppet and, during disabled operation, the stem member is forced into contact with the valve poppet to maintain the valve poppet in a closed condition relative to the valve seat.

BRIEF DESCRIPTION OF THE DRAWINGS

FIG. 1 is a partial sectional view of a valve disabler 10 of the prior art disposed proximate an inlet valve assembly 36;

FIG. 2 is a perspective view of a three cylinder pump 50 having a valve disabler 52 of the present invention installed within an inlet valve port thereof;

FIG. 3 is a cross sectional view of a valve disabler 52 of the present invention disposed proximate an inlet valve assembly 56;

FIG. 4A is a partial sectional view of a multi-cylinder pump 70 similar to the type shown in FIG. 1 and taken along lines 4—4, illustrating the valve disabler of the present invention in the disable mode, whereby the valve poppet is maintained against the valve seat so as to disable the valve and restrict the pump to operation on all but one cylinder;

FIG. 4B is a partial sectional view of a multi-cylinder pump similar to the type shown in FIG. 1 and taken along lines 4—4, illustrating the valve disabler of the present invention in the enable mode, whereby the valve poppet is permitted to open and close in relation to the valve seat such that the pump operates on all cylinders;

FIG. 5A is a graphical representation of the fluid stream generated by a three cylinder pump during normal operation; and FIG. 5B is a graphical representation of the fluid stream generated by a three cylinder pump with one cylinder disabled via a valve disabler 52 of the present invention.

DETAILED DESCRIPTION OF THE PREFERRED EMBODIMENTS

Referring initially to FIG. 2, shown in perspective is a multi-cylinder pump 50 having a valve disabler 52 of the present invention engagedly coupled within a first inlet valve port, referred to generally by reference numeral 54. In the embodiment shown, pump 50 is a three cylinder plunger pump having a fluid inlet line 58 for directing fluid inward toward first, second, and third inlet valve assemblies (not shown) and a fluid outlet line 60 for directing fluid outward from first, second, and third outlet valve assemblies (not shown). Although not shown in FIG. 2, first, second and third inlet valve assemblies are disposed within pump 50 proximate valve disabler 52, a first valve cap 62, and a second valve cap 64, respectively. In similar fashion, first, second, and third outlet valve assemblies (not shown) are disposed within pump 50 proximate a third valve cap 66, a fourth valve cap 68, and a fifth valve cap 72, respectively. While pump 50 is shown as a three cylinder plunger pump in the embodiment shown in FIG. 2, it is to be understood that valve disabler 52 of the present invention may be similarly employed within any number of multi-cylinder pumps having such in-line valving, including but not limited to duplex (two cylinder) pumps and triplex (three cylinder) pumps. One such multi-cylinder pump for use with the present invention is disclosed in U.S. Pat. No. 4,498,372, the teachings of which are incorporated herein by reference. Moreover, while the valve disabler 52 is shown disposed within first inlet valve port 54, it is to be understood that valve disabler 52 can be used in association with any of the inlet valve assemblies of the particular type of multi-cylinder pump employed without hindering the disabling feature of the present invention.

Referring now to FIG. 3, shown is a partial sectional view of valve disabler 52 detailing the construction thereof. Valve disabler 52 of the present invention includes a body member 74 with a first end 74a and a second and 74b, an adjusting stem 76, an adjustment knob 78, a pin member 80, a washer member 82, an O-ring 84, and a support ring 86. Body member 74 includes a threaded portion 88 for facilitating the threaded engagement of valve disabler 52 within an inlet valve port (not shown) of a multi-cylinder pump and a concentrically disposed aperture. As can be seen, the concentrically disposed aperture formed within body member 74 includes a relatively narrow portion at first end 74a for receiving adjusting stem 76 therein and a relatively wide portion near the second end 74b for receiving washer member 82 therein. Washer member 82 is similarly provided within a concentrically disposed aperture formed therein having a relatively narrow portion for receiving adjusting stem 76 and a relatively wide portion for receiving O-ring 84 and support ring 86. Support ring 86 is composed of a TEFLON or other similar material and is provided in adjacent relation with O-ring 84 to provide added support to O-ring 84, which is constructed from Buna or similar rubber materials. This feature of providing added support to O-ring 84 is particularly important when the multi-cylinder pump which employs the valve disabler 52 is operating at high pressures. In particular, the use of support ring 86 in conjunction with O-ring 84 will allow the valve disabler 52 of the present invention to operate in a completely leak free fashion, even if the pressure generated by the multi-cylinder pump exceeds 1500 psi. Thus, by providing O-ring 84 and support ring 86 between washer member 82 as shown, the present invention is capable of operating at a full range of pressures serves to ensure that valve disabler 52 will not experience any fluid leakage during operation.

In an important aspect of the present invention, adjusting stem 76 is generally cylindrical in shape and, but for the upper threaded portion 90, has a uniform diameter throughout the entire length thereof. In order to affix adjustment knob 78 to adjusting stem 76, a complimentary notch is provided in both adjusting stem 76 and adjustment knob 78 for receiving pin member 80. A knurled portion 92 is provided about the periphery of adjustment knob 78 to provide an adequate purchase for a person to twist and adjust knob 78. In so doing, a person may selectively lower adjusting stem 76 into contact with a valve poppet 96 by twisting adjustment knob 78 in a clockwise fashion, which effectively locks valve poppet 96 against a valve seat 98 so as to disable inlet valve assembly 56. This, of course, disables the cylinder associated with valve disabler 52 such that the multi-cylinder pump produces an outlet fluid stream comprising a low frequency train of pressure pulses wherein the pressure differential between each successive pulse is relatively large. As noted above, this causes the jetter nozzle at the end of a hose member connected to the multi-cylinder pump to thrash back and forth in a serpentine manner such that the hose member can negotiate past a sharp bend or other obstruction in an underground pipe.

With focus being directed toward FIGS. 4A and 4B, a multi-cylinder pump 70 is shown in a partial sectional view taken along lines 4—4 in FIG. 2 with a valve disabler 52 of the present invention threadedly engaged within an inlet valve port 54. Pump 70 includes, in general, a pump head 100, a pump housing 110, and a back plate 112. Due to the cross-sectional nature of FIGS. 4A and 4B, only a single plunger member 114 is shown with a corresponding inlet valve 116 and a corresponding outlet valve 118. During the normal operating mode shown in FIG. 4B, adjustment knob 78 is twisted in a counterclockwise rotation such that adjusting stem 76 is free and clear from contact with valve poppet 96. With valve poppet 96 in this unrestricted condition, valve poppet 96 can interact freely with valve seat 98 to open and close inlet valve 116. For illustration purposes, valve poppet 96 is shown removed from valve seat 98 as is the case during the suction stroke of pump 70. During this suction stroke, fluid is drawn into inlet line 58 of pump 70. This inward flow of fluid overcomes the bias of valve spring 94 to remove valve poppet 96 from a normally closed position against valve seat 98. Although not shown, a return or exhaust stroke of plunger 114 causes valve poppet 96 to return to a closed position against valve seat 98 such that no fluid can flow back into inlet line 58. The return or exhaust stroke also causes a valve poppet 120 of outlet valve 118 to become removed from a normally closed position against a valve seat 122 such that a fluid stream can pass outwardly through outlet line 60.

A graphical representation of this fluid stream can be readily viewed with brief reference to FIG. 5A. In that pump 70 is a three cylinder suction pump, a first pressure waveform 140, a second pressure waveform 160 and a third pressure waveform 150 represent the fluid pressure generated within each respective cylinder during the suction and return strokes. In other words, a first cylinder generates pressure waveform 140, a second cylinder generates pressure waveform 160, and a third cylinder generates pressure waveform 150. As shown, the normal operation of pump 70 causes each pressure waveform 14, 150, 160 to become superimposed upon each other such that the resulting outward fluid stream is comprises of a high frequency train of individual pressure pulses wherein the pressure differential $\Delta p1$ between each successive pressure pulse is relatively small. When a hose member having a jetter nozzle is attached to the outlet line 60 of pump 70 for use in cleaning an underground pipe, this relatively smooth fluid stream allows the hose member to travel is a substantially straight forward manner through the pipe with negligible lateral movement.

During the disabled mode shown in FIG. 4A, adjustment knob 78 is twisted in a clockwise rotation to drive the bottom of adjusting stem 76 into contact with valve poppet 96. Valve poppet 96 is thereby locked into position against valve seat 98 such that valve poppet 98 cannot be removed therefrom. Due to the threaded engagement between adjusting stem 76 and body member 74, valve disabler 52 of the present invention is capable of maintaining valve poppet 96 firmly against valve seat 98 regardless of the pressure developed within pump 70. This effectively thwarts the ingress of fluid into the cylinder associated with valve disabler 52 which, in turn, renders outlet valve 118 virtually useless in its pumping capability. This effect can best be seen with further reference to FIG. 5B, which illustrates graphically the fluid stream generated by pump 70 during the disabled mode. As shown, the removal of the pumping capability of the cylinder associated with valve disabler 52 eliminates pressure waveform 150 from the cumulative fluid stream. In so doing, the period of time between each pressure pulse is increased, which translates into a reduced frequency of pressure pulses. Moreover, the removal of one of the pressure waveforms increases the pressure differential $\Delta p2$ between each successive pulse of the pressure waveform. As discussed earlier, the interrupted pressure pulses in combination with the increased pressure differential between each successive pressure pulse causes a jetter nozzle to wiggle back and forth in a generally lateral fashion such that the jetter nozzle can traverse past any sharp bend or other obstruction in the underground pipe.

From the foregoing it should now be recognized that an improved apparatus has been advantageously provided herein which allows a person to selectively disable a single inlet valve within a multi-cylinder pump for the purpose of aiding a hose member to effectively negotiate down a meandering and torsious path within an underground piping system without stalling or becoming otherwise obstructed.

The valve disabler of the present invention has a simplified design over the prior art, requiring a minimal number of requisite parts and assembly labor. The valve disabler provided herein also is designed to eliminate any leaking and, moreover, is very economical, requiring a minimal amount of machining to produce each requisite part. Finally, the valve disabler of the present invention is of a reduced size comparable to that found in the prior art, thereby minimizing the likelihood that the valve disabler of the present invention will experience inadvertent contact.

The preferred apparatus embodiments depicted herein are exemplary and numerous modifications, dimensional variations, and rearrangements can be readily envisioned to achieve an equivalent result, all of which are intended to be embraced within the scope of the appended claims.

For example, although not shown in the accompanying drawings, it is to be understood that the knob member may be provided with "ON" an "OFF" designations to further aid the consumer in operating the valve disabler of the present invention. Furthermore, it is advantageously provided that the valve disabler of the present invention may be dimensioned to be accepted within a wide variety of pumping systems, regardless of the manufacturer. As such, the present invention provides a quick and easy way to retro-fit any number of multi-cylinder pumps to produce a system capable of disabling the multi-cylinder pump for aiding a hose member to negotiate down a torsious and/or meandering path within an underground pipe.

What is claimed is:

1. A method for selectively disabling a single valve within a multi-cylinder pumping system, comprising the steps of:
   (a) providing a valve disabler having:
      (1) a body member having a first end, a second end, a concentrically disposed aperture formed between said first and second ends having a stem accepting portion and a washer accepting portion, and an exteriorly disposed engagement portion for affixing said body member proximate said inlet valve assembly of maid multi-cylinder pump;
      (2) a generally elongated and cylindrical stem member extending concentrically within said stem accepting portion of said aperture of said body member, said stem member including a threaded portion for engagement with said stem accepting portion of said aperture or maid body member, an engagement notch for fixing a knob member to said stem member; and
      (3) a seal arrangement disposed within said washer accepting portion of said aperture of said body member, said seal arrangement including a washer member having a concentrically disposed aperture formed therein for accepting said stem member and a groove capable receiving at least one support ring therein; and
   (b) selectively operating said knob member to force said stem member into contact with said valve poppet such that said pumping system generates a low frequency train of pressure pulses creating a pressure differential between pulses of said train of pressure pulses.

2. An apparatus for disabling a valve assembly in a multi-cylinder pump, said multi-cylinder pump defining an aperture for receiving said valve assembly, said valve assembly including a valve poppet and a valve seat, said apparatus comprising;

a generally cylindrical body member of unibody construction having a first end disposed opposite and generally parallel to a second end, an interior surface defining a concentric and elongated aperture between said first and and said second end, and a first threaded portion disposed along an exterior surface of said body member proximate said second end for engaging said body member to said multi-cylinder pump aperture, said of said body member aperture including a threaded portion proximate said first end and a washer portion proximate said second end;

a generally elongated stem member extending concentrically within said aperture of said body member, said stem member having a first and, a second and, and a threaded portion disposed proximate said first end for engagement with said threaded portion of said aperture of said body member;

a knob member fixedly attached to said first end of said stem member;

a washer member for placement within said washer portion of said aperture of said body portion, said washer member including an interiorly disposed groove extending between said washer member, said stem member, and said body member, said groove being capable of receiving at least one support ring therein, wherein said body member is positioned proximate said valve assembly such that said second end of said stem member may be selectively brought into contact with said valve poppet to maintain said valve poppet against said valve seat to disable a single cylinder within said multi-cylinder pump.

3. An improved valve disabler for use in high pressure pipe cleaning systems, said high pressure pipe cleaning system including a multi-cylinder pump, said multi-cylinder pump including an inlet valve assembly having a valve poppet and a valve seat, comprising:

a body member having a first end, a second end, a concentrically disposed aperture formed between said first and second ends having a stem accepting portion and a washer accepting portion, and an exteriorly disposed engagement portion for affixing said body member proximate said inlet valve assembly of said multi-cylinder pump;

a generally elongated and cylindrical stem member extending concentrically within said stem accepting portion or said aperture of said body member, said stem member including a threaded portion for engagement with said stem accepting portion of said aperture of said body member, an engagement notch for fixing a knob member to said stem member; and a seal arrangement disposed within said washer accepting portion of said aperture of said body member, said seal arrangement including a washer member having a concentrically disposed aperture formed therein for accepting said stem member and a groove capable receiving at least one support ring therein;

wherein, during normal operation, said stein member is removed from contacting said valve poppet and wherein, during disabled operation, said stem member is forced into contact within said valve poppet to maintain said valve poppet in a closed condition relative to said valve seat.

* * * * *